United States Patent
Knock et al.

(10) Patent No.: US 11,768,471 B1
(45) Date of Patent: Sep. 26, 2023

(54) SYSTEMS AND METHODS FOR CREATING A CUSTOMIZED WATCH FACE AND RETRIEVING THE WATCH FACE TO BE DISPLAYED

(71) Applicant: Watch Skins Corporation, San Juan, PR (US)

(72) Inventors: Collin Knock, San Juan, PR (US); Justin Knock, San Juan, PR (US)

(73) Assignee: Watch Skins Corporation, San Juan, PR (US)

( * ) Notice: Subject to any disclaimer, the term of this patent is extended or adjusted under 35 U.S.C. 154(b) by 0 days.

(21) Appl. No.: 17/728,541

(22) Filed: Apr. 25, 2022

Related U.S. Application Data

(63) Continuation of application No. 17/367,260, filed on Jul. 2, 2021.

(51) Int. Cl.
| | |
|---|---|
| *G04G 9/00* | (2006.01) |
| *G04G 17/04* | (2006.01) |
(Continued)

(52) U.S. Cl.
CPC ......... *G04G 9/0064* (2013.01); *G04G 9/0017* (2013.01); *G04G 17/04* (2013.01); *G06F 3/0481* (2013.01); *G06Q 20/367* (2013.01)

(58) Field of Classification Search
CPC ...... G06Q 20/123; G04G 9/00; G04G 9/0064; G04G 17/04; G04G 9/0017; G06F 3/0481
See application file for complete search history.

(56) References Cited

U.S. PATENT DOCUMENTS

| | | |
|---|---|---|
| 9,621,678 B1 | 4/2017 | Guastaferro |
| 10,373,158 B1 | 8/2019 | James |
(Continued)

FOREIGN PATENT DOCUMENTS

| | | |
|---|---|---|
| JP | 2019083013 | 5/2019 |
| JP | 2019083013 A | 5/2019 |
(Continued)

OTHER PUBLICATIONS

Tim Swanson. "Great Chain of Numbers: A Guide to Smart Contracts, Smart Property and Trustless Asset Management." (2014). Retrieved online Jul. 6, 2022. https://s3-us-west-2.amazonaws.com/chainbook/Great+Chain+of+Numbers+A+Guide+to+Smart+(Contracts%2C+Smart+Property+and+Trustless+Asset+Management+-+Ti (Year: 2014).

(Continued)

*Primary Examiner* — Sean Kayes
(74) *Attorney, Agent, or Firm* — ESPLIN & ASSOCIATES, PC

(57) ABSTRACT

Systems and methods to create a customized watch face and retrieve the watch face to be displayed are disclosed. Exemplary implementations may effectuate presentation of a selection interface; receive a mint request to mint the watch face in accordance with a watch face design; effectuate a transfer of consideration from a user wallet to an administrative wallet; mint the watch face; transfer a non-fungible token to the user wallet; receive a display request to display the watch face on a watch screen; determine whether the user wallet holds a non-fungible token associated with the watch face; responsive to the user wallet holding the non-fungible token, facilitate display of the watch face on the watch screen; responsive to the user wallet not holding the non-fungible token, take no action to facilitate display of the (Continued)

watch face on the watch screen; and/or perform other operations.

10 Claims, 5 Drawing Sheets

(51) Int. Cl.
  G06Q 20/36 (2012.01)
  G06F 3/0481 (2022.01)

(56) References Cited

U.S. PATENT DOCUMENTS

| | | |
|---|---|---|
| 10,427,045 B2 | 10/2019 | Thompson |
| 10,540,653 B1 | 1/2020 | James |
| 10,540,654 B1 | 1/2020 | James |
| 10,546,326 B2 | 1/2020 | Publicover |
| 10,565,616 B2 | 2/2020 | Thompson |
| 10,565,623 B2 | 2/2020 | Katz |
| 10,580,043 B2 | 3/2020 | Publicover |
| 10,600,009 B1 | 3/2020 | Augustine |
| 10,701,067 B1 | 6/2020 | Ziraknejad |
| 10,708,042 B1 | 7/2020 | Rubenstein |
| 10,936,647 B2 | 3/2021 | Abuelsaad |
| 11,080,687 B2 | 8/2021 | Vladi |
| 11,120,475 B2 | 9/2021 | Katz |
| 11,127,048 B2 | 9/2021 | Publicover |
| 11,133,936 B1 | 9/2021 | Branton |
| 11,182,467 B1* | 11/2021 | Medina .............. G06F 3/147 |
| 11,200,569 B1 | 12/2021 | James |
| 11,200,869 B1 | 12/2021 | Post |
| 11,250,399 B2 | 2/2022 | Knock |
| 11,263,607 B2 | 3/2022 | Knock |
| 11,308,487 B1 | 4/2022 | Foster |
| 11,316,691 B2 | 4/2022 | Westland |
| 11,334,883 B1 | 5/2022 | Auerbach |
| 11,341,451 B2 | 5/2022 | Benayoun |
| 2002/0099452 A1* | 7/2002 | Kawai .............. G04G 9/0011 700/16 |
| 2015/0213504 A1 | 7/2015 | Katz |
| 2015/0319161 A1 | 11/2015 | Dimmick |
| 2016/0253710 A1 | 9/2016 | Publicover |
| 2017/0201779 A1 | 7/2017 | Publicover |
| 2017/0357426 A1 | 12/2017 | Wilson |
| 2018/0091316 A1 | 3/2018 | Stradling |
| 2018/0225660 A1 | 8/2018 | Chapman |
| 2018/0331835 A1 | 11/2018 | Jackson |
| 2019/0015747 A1 | 1/2019 | Thompson |
| 2019/0019218 A1 | 1/2019 | Thompson |
| 2019/0172025 A1 | 6/2019 | Vieri |
| 2019/0220836 A1 | 7/2019 | Caldwell |
| 2020/0005284 A1* | 1/2020 | Vijayan .............. H04L 63/08 |
| 2020/0110814 A1 | 4/2020 | Abuelsaad |
| 2020/0118068 A1 | 4/2020 | Turetsky |
| 2020/0143426 A1 | 5/2020 | Katz |
| 2020/0175485 A1 | 6/2020 | Knock |
| 2020/0225655 A1 | 7/2020 | Cella |
| 2020/0242105 A1 | 7/2020 | Rich |
| 2020/0297269 A1 | 9/2020 | Vieri |
| 2020/0327609 A1 | 10/2020 | Dubrofsky |
| 2020/0348662 A1 | 11/2020 | Cella |
| 2020/0349610 A1 | 11/2020 | Publicover |
| 2020/0349611 A1 | 11/2020 | Publicover |
| 2020/0374113 A1 | 11/2020 | Noam |
| 2020/0380476 A1 | 12/2020 | Trudeau |
| 2020/0393957 A1* | 12/2020 | Wilson .............. G06F 1/163 |
| 2021/0119785 A1 | 4/2021 | Ben-Reuven |
| 2021/0157312 A1 | 5/2021 | Cella |
| 2021/0201280 A1 | 7/2021 | Knock |
| 2021/0248560 A1 | 8/2021 | Rajendran |
| 2021/0342822 A1 | 11/2021 | Lau |
| 2021/0365948 A1 | 11/2021 | Briscombe |
| 2021/0374807 A1 | 12/2021 | Katz |
| 2022/0036405 A1 | 2/2022 | Publicover |
| 2022/0075845 A1 | 3/2022 | Bowen |
| 2022/0108262 A1 | 4/2022 | Cella |
| 2022/0114567 A1 | 4/2022 | Knock |
| 2022/0114600 A1 | 4/2022 | Blackburn |
| 2022/0146822 A1 | 5/2022 | El-Ghoroury |
| 2022/0150570 A1 | 5/2022 | Weerasinghe |
| 2022/0164815 A1 | 5/2022 | Petersen |
| 2022/0207615 A1 | 6/2022 | Naqvi |
| 2022/0261853 A1 | 8/2022 | Publicover |
| 2022/0300966 A1 | 9/2022 | Andon |
| 2022/0391888 A1 | 12/2022 | Kim |
| 2023/0004125 A1 | 1/2023 | Knock |
| 2023/0101814 A1 | 3/2023 | Knock |
| 2023/0108983 A1 | 4/2023 | Vosseller |

FOREIGN PATENT DOCUMENTS

| | | |
|---|---|---|
| JP | 2019096272 | 6/2019 |
| JP | 2019096272 A | 6/2019 |
| JP | 2020068388 | 4/2020 |
| JP | 2020068388 A | 4/2020 |

OTHER PUBLICATIONS

United Nations Economic Commission for Europe, United Nations Centre for Trade Facilitation and Electronic Business. "White Paper Blockchain in Trade Facilitation." (2020). Retrieved online Jul. 6, 2022. https://unece.org/DAM/trade/Publications/ ECE-TRADE-457E_WPBlockchainTF.pdf (Year: 2020).

Thiago Bueno et al. "Blockchain and Industry 4.0: Overview, Convergence, and Analysis." (Jan. 2020). Retrieved online Jul. 6, 2022. https://www.researchgate.net/publication/338358883_Blockchain_and_Industry_40_Overview_Convergence_and_Analysis/link/5f902b70299bf1b53e37affc/download (Year: 2020).

PCT Search Report and Written Opinion for Application No. PCT/US23/015286, dated Apr. 17, 2023 (10 pages).

PCT Search Report and Written Opinion for Application No. PCT/US23/016753 dated Apr. 24, 2023 (7 pages).

Thiago Bueno et al. Blockchain and Industry 4.0: Overview, Convergence, and Analysis. (Jan. 2020). 33 pages.

Tim Swanson. Great Chain of Numbers: A Guide to Smart Contracts, Smart Property and Tmstless Asset Management. (2014) 130 pages.

United Nations Economic Commission for Europe, United Nations Centre for Trade Facilitation and Electronic Business. White Paper Blockchain in Trade Facilitation. (2020). 159 pages.

* cited by examiner

SYSTEMS AND METHODS FOR CREATING A CUSTOMIZED WATCH FACE AND RETRIEVING THE WATCH FACE TO BE DISPLAYED

FIELD OF THE DISCLOSURE

The present disclosure relates to creating and/or retrieving a customized watch face to be displayed on a watch screen.

BACKGROUND

Smartwatches configured to display visual content are known. Watch faces capable of being displayed on smartwatches are known. Distributed ledgers are known techniques to produce a secure record or registry of ownership of assets, transactions, and other information. For example, a distributed blockchain is a distributed ledger. Different types of distributed ledgers are known.

SUMMARY

One aspect of the present disclosure relates to a system configured to create a customized watch face that is capable of being displayed on a watch screen (e.g., of a smart watch). The user may select watch face features with varying styles, formats, colors, and/or other aspects through a selection interface. For example, the user may select a particular style of hour makers, hour hands, minute hands, and/or other features to be included in the customized watch face. The values of watch face features selected by the user may define a watch face design that is later used to generate the watch face. The user may purchase the customized watch face design by submitting a mint request and transferring the appropriate amount of consideration from a user wallet to an administrative wallet. The transfer of consideration from the user wallet to an administrative wallet may include the transfer of value from an address associated with the user wallet to an address associated with the administrative wallet on a decentralized ledger. Once consideration is received by the administrative wallet, the watch face capable of being displayed may be minted and the watch face may contain the values of watch face features defined by the watch face design purchased by the user. A watch face record may be generated for the minted watch face and a non-fungible token may be transferred to the address on the decentralized ledger that corresponds to the user wallet. The watch face record may include information pertaining to the watch face features and may include a watch face identifier that is unique to the watch face. The non-fungible token may indicate the watch face identifier, such that holding the non-fungible token indicates ownership of the watch face associated to the watch face identifier.

The system is further configured to retrieve the watch face to be displayed on a watch screen. The system may receive a display request from a user. The display request may indicate the watch face being requested (e.g., using the watch face identifier), the user associated with the watch screen, and/or other information. Responsive to receiving the display request, the system may determine whether the user wallet associated with the user holds a non-fungible token associated with the watch face being requested. Holding the non-fungible token may indicate the non-fungible token is recorded on the decentralized ledger at the address associated with the user wallet. Responsive to determining the user wallet holding the non-fungible token, the system may facilitate transmission of information to the watch screen that causes the watch screen to display the watch face. Responsive to determining the user wallet does not hold the non-fungible token, the system may take no further action to transmit information to the watch screen.

The system configured to create a watch face and retrieve the watch face to be displayed may include one or more of servers, decentralized ledger servers, client computing platforms, external resources, networks, users, user interfaces, and or other components. The one or more servers and/or decentralized ledger servers may include electronic storage, one or more hardware processors, one or more blockchains, and/or other components. The electronic storage may be configured to store information. The one or more hardware processors may be configured to execute one or more computer processing components. The one or more computer processing components may include one or more of a presentation component, a transaction component, a minting component, a receipt component, a verification component, a display component, an input component, a communication component, and/or other components.

As used herein, any association (or relation, or reflection, or indication, or correspondency) involving servers, processors, client computing platforms, users, user accounts, watch faces, watch face features, assets, requests, manners of usage, exchanges, challenges, offers, transactions, ownership, decentralized ledgers, responses, denials, contracts, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "receive" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any" effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
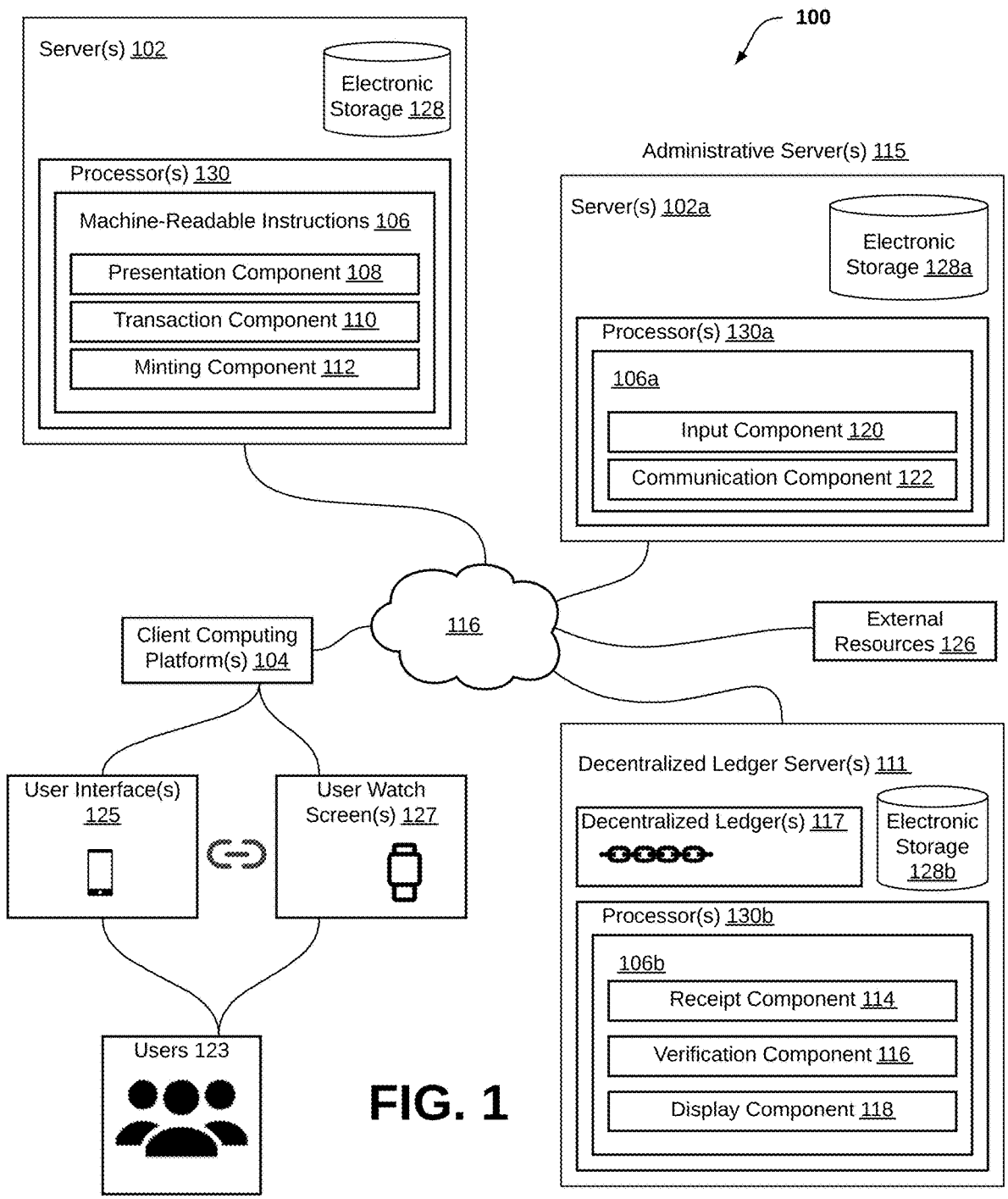
FIG. 1 illustrates a system configured to create a customized watch face and retrieve the watch face to be displayed, in accordance with one or more implementations.

FIG. 1 illustrates a system 100 configured to create a customized watch face and retrieve the watch face to be displayed, in accordance with one or more implementations. As used herein, the term "watch face" may refer to a customized watch face selected and/or created by a user. As used herein "identifier" may refer to a watch face identifier that is unique to a particular watch face. For example, in some implementations, an identifier or identifying information of a watch face may include or be based on a combination of different types of information, include but not limited information regarding the type of watch face, the watch face features, the values of watch face features, an alphanumeric string (e.g., a serial number or other text string) or other human and/or machine readable identifier of the watch face, and/or other types of information. As used herein ownership of a watch face may be tracked, recorded, and/or otherwise registered on one or more decentralized ledgers.

System 100 may include one or more server(s) 102, decentralized ledger server(s) 111, administration servers 115, one or more client computing platform(s) 104, user interface(s) 125, one or more external resources 126, and/or other components. As used in descriptions herein, any use of the term "user" may refer to users 123. Electronic storage 128a and electronic storage 128b may be similar to electronic storage 128 as described elsewhere in this disclosure, though included in administration server(s) 115 and decentralized ledger server(s) 111, respectively, as depicted in FIG. 1.

Decentralized ledger server(s) 111 may be used to implement one or more decentralized ledger(s) 117. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned blockchain may be configured to record information. The recorded information may pertain to one or more watch faces recorded on decentralized ledger(s) 117. The recorded information may include ownership of the watch faces. User actions may effectuate modifications to the recorded information pertaining to the watch faces. For example, ownership rights and/or other rights may be modified. In some implementations, a watch face may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of decentralized ledger(s) 117 ledger may be grouped together in units that are referred to as blocks and/or nodes. For example, an individual block may include one or more assets (e.g., watch faces) and/or one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., watch faces), one or more transactions, and/or other information. As used herein, "an individual block including a watch face" may refer to the individual block including a watch face record and/or a watch face identifier associated with the watch face.

As depicted in FIG. 1, decentralized ledger server(s) 111 may include one or more of electronic storage 128b, processor(s) 130b, machine-readable instructions 106b, (node of) decentralized ledger(s) 117, and/or other components. Machine-readable instructions 106b may include one or more instruction components. The instruction components may include computer program components. The instruction components may include one or more of a receipt component 114, a verification component 116, a display component 118, and/or other instruction components. In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or otherwise distributed and diverse.

In some implementations, one or more decentralized ledger(s) 117 implemented by decentralized ledger server(s) 111 may be publicly accessible. In some implementations, one or more decentralized ledgers implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

Server(s) 102 may be configured to communicate with one or more client computing platforms 104 according to a client/server architecture and/or other architectures. Client computing platform(s) 104 may be configured to communicate with other client computing platform(s) 104 via server(s) 102 and/or according to a peer-to-peer architecture and/or other architectures. User(s) 123 may access system 100 via client computing platform(s) 104. In some implementations, system 100 and/or decentralized ledger server(s) 111 may be configured to communicate with one or more of server(s) 102, users 123, and/or other entities and/or components, e.g., through one or more network(s) 116. In some implementations, client computing platform(s) 104 may be accessed through one or more user interface(s) 125. User interface(s) 125 is shown as a mobile device but may include one or more other computing devices. User interface(s) 125 may be linked and/or associated to one or more user watch screen(s) 127. User watch screen(s) 127 may be include in a smartwatch, a digital watch, a wearable device, a non-wearable device, a portable electronic device (e.g., personal digital assistance (PDA)), and/or other devices. User interface(s) 125 may be linked and/or associated to user watch screen(s) 127 through wireless connection (e.g., Bluetooth pairing), wired connection, and/or other pairing methods.

Server(s) 102 may include electronic storage 128, processor(s) 130, machine-readable instructions 106, and/or other components. Server(s) 102 may be configured by machine-readable instructions 106. Machine-readable instructions 106 may include one or more instruction components. The instruction components may include computer program components. The instruction components may include one or more of a presentation component 108, a transaction component 110, a minting component 112, and/or other instruction components. Processor(s) 130a and processor(s) 130b may be similar to processor(s) 130 as described elsewhere in this disclosure, though included administration server(s) 115 and decentralized ledger server(s) 111, respectively, as depicted in FIG. 1. Machine-readable instructions 106a and machine-readable instructions 106b may be similar to machine-readable instructions 106 as described elsewhere in this disclosure, though included in administration server(s) 115 and decentralized ledger server(s) 111, respectively, as depicted in FIG. 1.

Presentation component 108 may be configured to effectuate presentation of a selection interface on one or more of client computing platform(s) 104 associated with a user 123. The selection interface may facilitate entry and/or selection of a watch face design by user 123. The selection interface may display one or more values for individual ones of watch face features. Watch face features may include one or more of hour hands, minute hands, backsplash, dials, subdials, hour markers, weather displays, date displays, and/or other components capable of being included in a watch face. In some implementations, particular watch face features may be static and/or unchanging (e.g., hour markers). In some implementations, watch face features may change based on one or more of the passage of time (e.g., hour hand, minute hand, date display), real world events and/or real-time data (e.g. weather display), and/or other factors. For example, the backsplash of the watch face may include a video, a gif, a slide show of images, and/or other moving and/or still images.

In some implementations, the selection interface may display the one or more values for watch face features with an associated cost. A value for a watch face feature may indicate and/or represent a variation of color, style, format, type, and/or other aspect of the watch face feature. For example, a first watch face feature may be hour markers and/or another feature. Hour markers may me shown as dashes, numbers, roman numerals, and/or other symbols. A first value may represent the hour markers as dashes, a second value may represent the hour markers as numbers, a third value may represent the hour markers as roman numerals, and so on and so forth. The first value, the second value, the third value, and/or other values may be included in the selection interface and/or be capable of being selected by user 123. The associated cost for an individual value may be based on the popularity of the value, the remaining inventory of the value (i.e., the value can only be selected a fixed number of times and/or by a fixed number of users), the appearance of the value, and/or other information. In some implementations, the associated costs of the one or more values may change based on the popularity of the value, the remaining inventory of the value, the appearance of the value, and/or other information. The associated costs of the one or more values may change every day, every two days, every 12 hours, every 2 hours, every hour, and/or other intervals of time. In some implementations, the associated costs may be in units of dollars (USD), euros (EUR), Bitcoin (BTC), Ethereum (ETH), Tether (USDT), Dogecoin (DOGE), and/or other currencies.

In some implementations, the selection interface may display one or more pre-selected watch face designs capable of being selected by user 123 for purchase. An individual watch face design may be defined by one or more values of watch face features. The watch face design may represent the appearance of an associated watch face. For example, a watch face design may indicate roman numeral hour markers, a gold colored hour hand, a silver colored minute hand, a blue colored backsplash, and/or other values of watch face features. The pre-selected watch face designs may include one or more values of watch face features that are selected by other users 123, selected by one or more administrative users, randomly generated, and/or other methods of being selected. In some implementations, individual ones of the pre-selected watch face designs may include an associated cost. The associated cost of a particular pre-selected watch face designs may be based on the combined associated costs of the values of watch face features included in the watch face design. In some implementations, the associated costs of the particular pre-selected watch face design may be set by a user that created the watch face design. In some implementations, the user 123 may purchase a randomly generated watch face design before viewing the watch face design and/or after viewing the watch face design. In some implementations, the particular watch face design may only be selected (i.e., purchased) a fixed number of times. Responsive to the particular watch face design being selected the fixed number of times, the particular watch face design may be shown on the selection interface as having a sold-out status and/or not included in the selection interface.

Transaction component 110 may be configured to receive from client computing platform(s) 104, a mint request to mint the watch face in accordance with the watch face design entered and/or selected through the selection interface. In some implementations, the mint request may include information pertaining to the watch face design, the user, and/or other information. Information pertaining to the watch face design may include the values of watch faces features defining the watch face design, the cost of the watch face design, and/or other information. In some implementations, the mint request may be received from the client computing platform(s) 104 via one or more networks 116. The mint request may be automatically submitted to transaction component 110 responsive to user 123 selecting a watch face design through the selection interface, user 123 selecting one or more action buttons on user interface(s) 125, user 123 initiating transfer of consideration, and/or other user actions.

Transaction component 110 may be configured to, responsive to receipt of the mint request, effectuate a transfer of consideration from a user wallet associated with the user to an administrative wallet and/or other wallets. The user wallet and the administrative wallet may each correspond to addresses on decentralized ledger(s) 117 such that the transfer of consideration involves a transfer of value on decentralized ledger(s) 117 from the address associated with the user wallet to the address associated with the administrative wallet. In some implementations, the amount of consideration and/or value may be determined by the cost of the watch face design and/or the costs of the values of watch face features defining the watch face design. The amount of consideration and/or value may be included in the received mint request. The amount of consideration and/or value may further include a transfer fee, a transaction fee, a gas fee, and/or other types of fees in addition to the cost of the watch face design.

In some implementations, the user wallet may be linked to an external wallet. The external wallet may allow the user to store and manage funds on a public decentralized ledger(s) 117. The public decentralized ledger(s) 117 may be part of either EOSIO mainnet, Ethereum mainnet, Ethereum 1.5, Ethereum 2.0, a derivative of Ethereum 2.0 that is configured to perform transactions of Ether (ETH) between accounts, a derivative of EOSIO that is configured to perform transactions of EOS between different accounts, and/or other distributed computing platforms. In some implementations, funds may be transferred from the linked external wallet to the user wallet. Funds transferred from the linked external wallet to the user wallet may be in units of dollars (USD), euros (EUR), Bitcoin (BTC), Ethereum (ETH), Tether (USDT), Dogecoin (DOGE), and/or other currencies. Transferring funds from the external wallet to the user wallet may include a transfer fee, a gas fee, and/or other kinds of fees. The funds transferred and/or stored in the user wallet may be used within system 100 (e.g., to buy a watch face). In some implementations, the user wallet may store funds from transactions made within system 100 (e.g., from selling a watch face). In some implementations, funds stored in the user wallet may only be used for transactions on decentralized ledger(s) 117 (e.g., buying, selling, or transferring watch faces). Funds stored in the user wallet may be transferred to the external wallet to be used for transactions on decentralized ledgers outside of system 100 (e.g., buying, selling, or transferring other digital and/or non-digital assets).

Minting component 112 may be configured to, responsive to the administrative wallet receiving the consideration, mint the watch face. As used herein, the word "mint" may refer to performance, initiating, and/or execution of the process(es), transaction(s), procedure(s), operation(s), and/or step(s) that result in the instantiation of the watch face, including the establishment of ownership, and definition of appearance of the watch face. Minting the watch face may include generating the watch face record for the watch face in accordance with the watch face design. Minting the watch face may further include transforming the watch face design into a format that is readable by a device with a watch screen and/or other methods of creating a displayable watch face. In some implementations, minting the watch face may include building an executable program. The executable program to be transmitted to a device capable of executing the program. In some implementations, execution of the program by the device may display a watch face with the values of watch face features defining the watch face design on a watch screen of the device and/or other devices. In some implementations, the watch face record may include the values of the watch face features that define the watch face design. In some implementations, the watch face record may be recorded at an address on decentralized ledger(s) 117 in a smart contract and/or other executable code. The watch face record may include information pertaining to the minted watch face, including but not limited to the values of the watch face features defining the watch face design.

In some implementations, the watch face record may include a watch face identifier. The watch face identifier may be unique to the minted watch face. The identifier may include an alphanumeric string (e.g., a serial number or other text string) or other human and/or machine-readable identifier of the watch face and/or other information. The identifier may be based on the values of watch face features, the time the watch face was minted, the day the watch face was minted, and/or other information. For example, a first watch face may have a first watch face identifier of '001', a second watch face may have a second watch face identifier of '002', a third watch face may have a third watch face identifier of '003', and so on and so forth. The first, second, third watch face identifiers, and/or other identifiers may be determined based on the order in which the watch faces are minted. The first second, third watch face identifiers and/or other watch face identifiers may be unique, such that no two watch face identifiers are the same. In some implementations, the first watch face and the second watch face may be minted in accordance with a first watch face design and a second watch face design, respectively. The first watch face design and the second watch face design may be defined by the same values of watch face features (i.e., the first watch face and the second watch face have a similar or the same appearance). The first watch face identifier and the second watch face identifier may still have different numerical values. In some implementations, the watch face identifier may indicate an owner history for the associated watch face. For example, the watch face identifier may include ownership information. Ownership information may indicate and/or identify a first owner, a second owner, a current owner, and/or other owners. By way of non-limiting example, the watch face may have been owned by the first owner prior to being owned by the second owner. The watch face may have been owned by the second owner prior to being owned by the current owner.

In some implementations, minting the watch face may include burning the combination of values of watch face features that define the watch face design. As used herein, the word "burn" may refer to recordation of the values of watch face features for an individual watch face such that future minting of watch faces with identical values of some or all of the watch face features are limited or even prohibited. Burning the combination of values may include making the combination of values unavailable for selection, unavailable for minting, and/or unavailable for other actions. For example, unavailable combinations of values may not be shown in the selection interface and/or the user may not be allowed to proceed with purchase of that watch face. In some implementations, a combination of values may be burned after being minted once, after being minted five times, and/or after being minted a fixed number of times. In some implementations, a list of burned combinations may be stored in electronic storage 128, on decentralized ledger(s) 117, and/or other locations. The list of burned combinations may include information pertaining to the combinations of values of watch face features that have been burned and/or are unavailable to be minted. In some implementations, minting component 112 receiving a mint request may effectuate a smart contract and/or other executable code to check the watch face design included in the mint request against the list of burned combinations. Responsive to the watch face design being on the list of burned combinations, the mint request may not be fulfilled. Responsive to the watch face design not being on the list of burned combinations, the mint request may be fulfilled and/or a watch face may be minted in accordance with the watch face design.

Minting component 112 may be configured to transfer a non-fungible token indicating the watch face identifier to the address on the decentralized ledger(s) 117 that corresponds to the user wallet. In some implementations, the non-fungible token may be transferred simultaneously to the watch face record being generated. In some implementations, transferring the non-fungible token may instruct the formation of a smart contract and/or the recording of the smart contract on decentralized ledger(s) 117 at the address corresponding to the user wallet. In some implementations, these instructions may instruct decentralized ledger(s) 117 to record and/or modify watch face records, transactions, and/or rights (e.g., ownership rights, distributions rights, etc.). In some implementations, the non-fungible token may be stored on a blockchain. The block chain may implement decentralized ledger(s) 117 and may be capable of recording rights pertaining to digital assets (e.g., watch faces). For example, a blockchain is a type of ledger, as well as a type of decentralized database that records rights pertaining to digital assets. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. In some implementations, the non-fungible tokens may be a type of asset. In some implementations, the non-fungible tokens may include one or more of security tokens, utility tokens, payment tokens, initial coin offering (ICO) tokens, virtual currency tokens, crypto tokens, ERC-20 tokens, ERC-721 tokens, EOS tokens, specialized tokens, platform tokens, and/or other tokens. In some implementations, the tokens not only represent value, but may have a specific use in a particular distributed computing platform, e.g., in the operation of decentralized ledger(s) 117.

Receipt component 114 may be configured to receive a display request to display the watch face on a watch screen. The display request may indicate user(s) 123 trying and/or wanting to display the watch face on the watch screen. In some implementations, user 123 may submit a display request through interacting with one or more user interface (s) 125, interacting with one or more devices with user watch screen(s) 127, and/or other ways. The display request may indicate the specific watch face (e.g., using the watch face identifier), a user associated with the watch screen, a user wallet associated with the user, an address on decentralized ledger(s) 117 associated with the user wallet, and/or other information.

Verification component 116 may be configured to, responsive to receiving the display request, determine whether the user wallet for a decentralized ledger(s) 117 holds a non-fungible token associated with the specific watch face. In some implementations, determining whether the user wallet holds a non-fungible token may include determining if the non-fungible token is recorded at the address associated with the user wallet on decentralized ledger(s) 117. In some implementations, the address associated with the user wallet may hold one or more tokens (i.e., the user owns one or more watch faces). The non-fungible token may be recorded on a smart contract and/or other executable code. Responsive to the non-fungible token being recorded at the address associated with the user wallet on decentralized ledger(s) 117, determine if the non-fungible token indicates the watch face identifier associated with the watch face. In some implementations, the watch face identifier may be included in the display request. Responsive to the non-fungible token indicating the watch face identifier associated with the watch face, a determination may be made that the user has ownership of the watch face. Responsive to the non-fungible token not indicating the watch face identifier associated with the watch face, a determination may be made that the user does not have ownership of the watch face. In some implementations, verification component 116 may be configured to obtain watch face rights (e.g., ownership rights, distribution rights, licensing rights, and/or other rights) for a particular watch face, responsive to the user having ownership of the particular watch face. In some implementations, verification component 116 may be configured to access decentralized ledger(s) 117 to obtain the watch face rights (that are recorded on decentralized ledger(s) 117, e.g., in one or more smart contracts).

Display component 118 may be configured to, responsive to the user wallet holding the non-fungible token associated with the watch face, facilitating display of the watch face on the watch screen. Facilitating display of the watch face may include initiating transmission of information to the watch screen that causes the watch screen to display the watch face. In some implementations, information may include the watch face design, the values of watch face features, the executable program, other executable code, and/or other information. In some implementations, the watch screen may be associates to user 123 and/or associated to the user wallet. Display component 118 may be further configured to, responsive to the user wallet not holding the non-fungible token associated with the watch face, take no further action to facilitate display of the watch face on the watch screen such that the watch face is not displayed on the watch screen Input component 120 may be configured to receive user input from administrative users. For example, the user input may include entry and/or selection of particular information, watch face design, values of watch face features, watch faces, and/or any entity or object that interacts with any part of system 100 and/or plays a part in the operation of system 100. For example, an administrative user may select a particular set of watch face designs and/or values of watch face features as the input for other components of system 100, such as presentation component 108. Additionally, the administrative user may select a particular adjustment to be displayed by presentation component 108 (e.g., increase the cost of one or more values of watch face features).

Communication component 122 may be configured to facilitate communication and/or interaction between administration server 115 and the rest of system 100. For example, communication component 122 may communicate user input received by input component 120 to other components of system 100.

Figure 4:
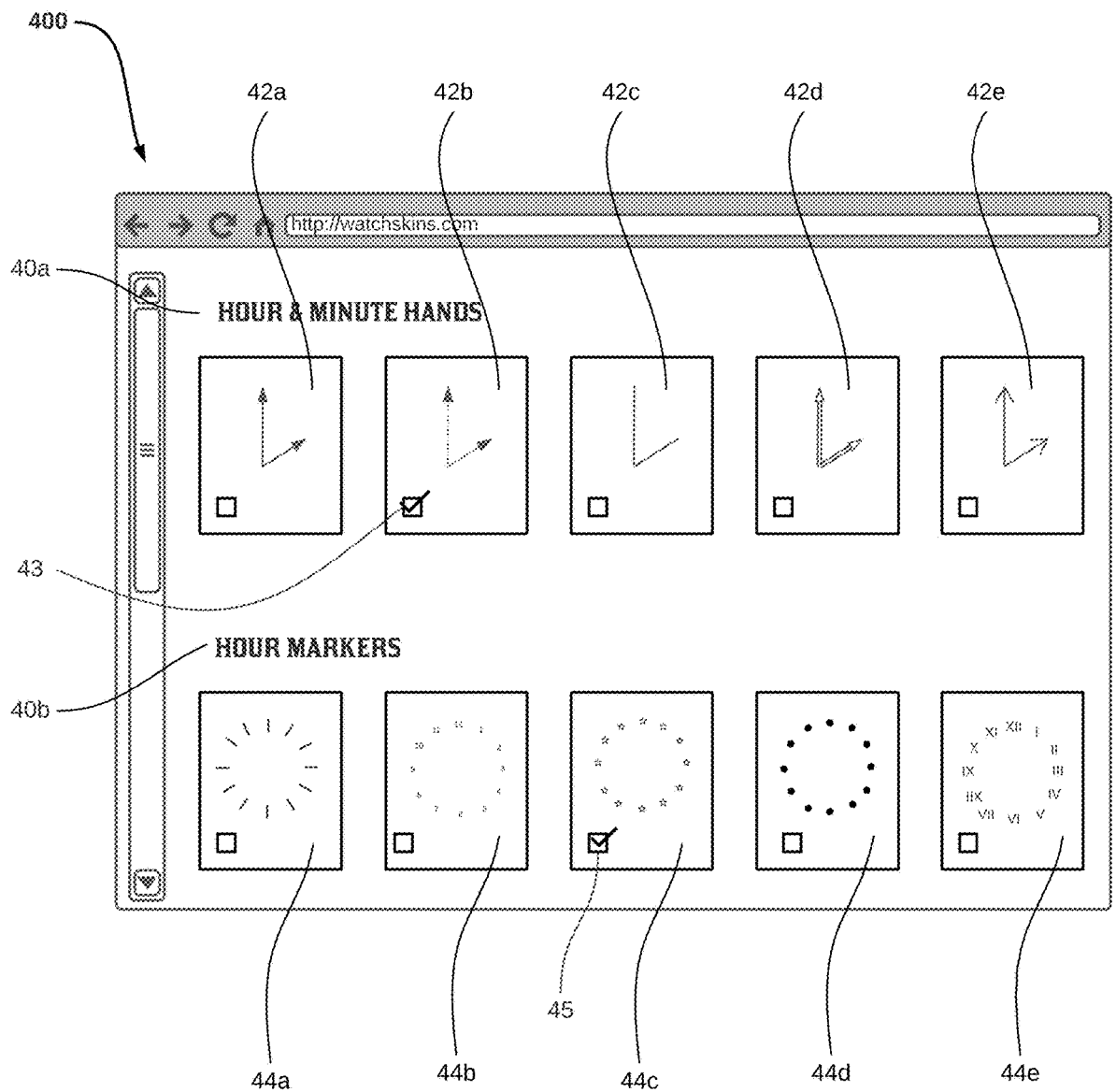
FIG. 4. illustrates an exemplary selection interface that may be utilized by a system to create a customized watch face, in accordance with one or more implementations.

FIG. 4 illustrates an exemplary selection interface 400 that may be used by a system to create a customized watch face and retrieve the watch face to be displayed in accordance with one or more implementations. In some implementations selection interface 400 may be presented on a user interface that is the same as or similar to user interface(s) 125 (as shown in FIG. 1 and described herein). In some implementations, a user may view selection interface 400 through a web browser, a mobile browser, a mobile application, and/or other platforms. In some implementations, the user may be required to create and/or login to a user account associated with the user to access selection interface 400. The user account may be specific to a distributed computing platform and/or system 100 (as shown in FIG. 1 and described herein). The user account associated with the user may also be associated with a user wallet. In some implementations, the user account and/or user wallet may store a user's inventory. The user's inventory may include one or more watch faces the user has purchased and/or currently owns (i.e., the user wallet holds a non-fungible token indicating the watch identifier associated with the watch face). In some implementations, the user account may be used to store association to one or more watches, watch screens, and/or other devices capable of display a watch face. The one or more devices associated to the user account may be capable of displaying one or more watch faces owned by the user.

Referring to FIG. 4, selection interface 400 may include one or more watch face features 40a-b and/or other watch face features. For example, watch face feature 40a may indicate selections for "Hour & Minute Hands" and watch face feature 40b may indicate selections for "Hour Markers". Selection interface 400 include values 42a-e for watch face feature 40a, values 44a-e for watch face feature 40b, and/or other values. In some implementations, individual ones of values 42a-e may indicate variations of watch face feature 40a that are capable of being selected by the user and individual values of 44a-e may indicate variations for watch face feature 40b. For example, value 42a-e each correspond to a different style and/or type of hour and minute hands capable of being included in a watch face design and/or a displayed watch face. In some implementations, the user may select one or more values for an individual watch face features, may select no values for the individual watch face feature, and/or may select exactly one value for the individual watch face feature.

In some implementations, selection of a particular value may include clicking, touching, tapping, and/or swiping an action button associated with the value and/or other actions. Referring to FIG. 4, selection interface 400 may include checkmarks 43, 45 and/or other checkmarks and/or components. Checkmark 43 may indicate the user has selected value 42b for watch face feature 40a and checkmark 45 may indicate the user has selected value 44c for watch face feature 40b. In some implementations, the user may select values for one or more watch face features prior to submitting a mint request. In some implementations, watch face features for which the user does not select a value may be randomly selected by the system during minting of the watch face. In some implementations, watch face features may include hour hands, minute hands, backsplash, dials, subdials, hour markers, weather displays, date displays, score displays (e.g., scores for sports games), stock price displays, and/or other watch face components.

Figure 5:
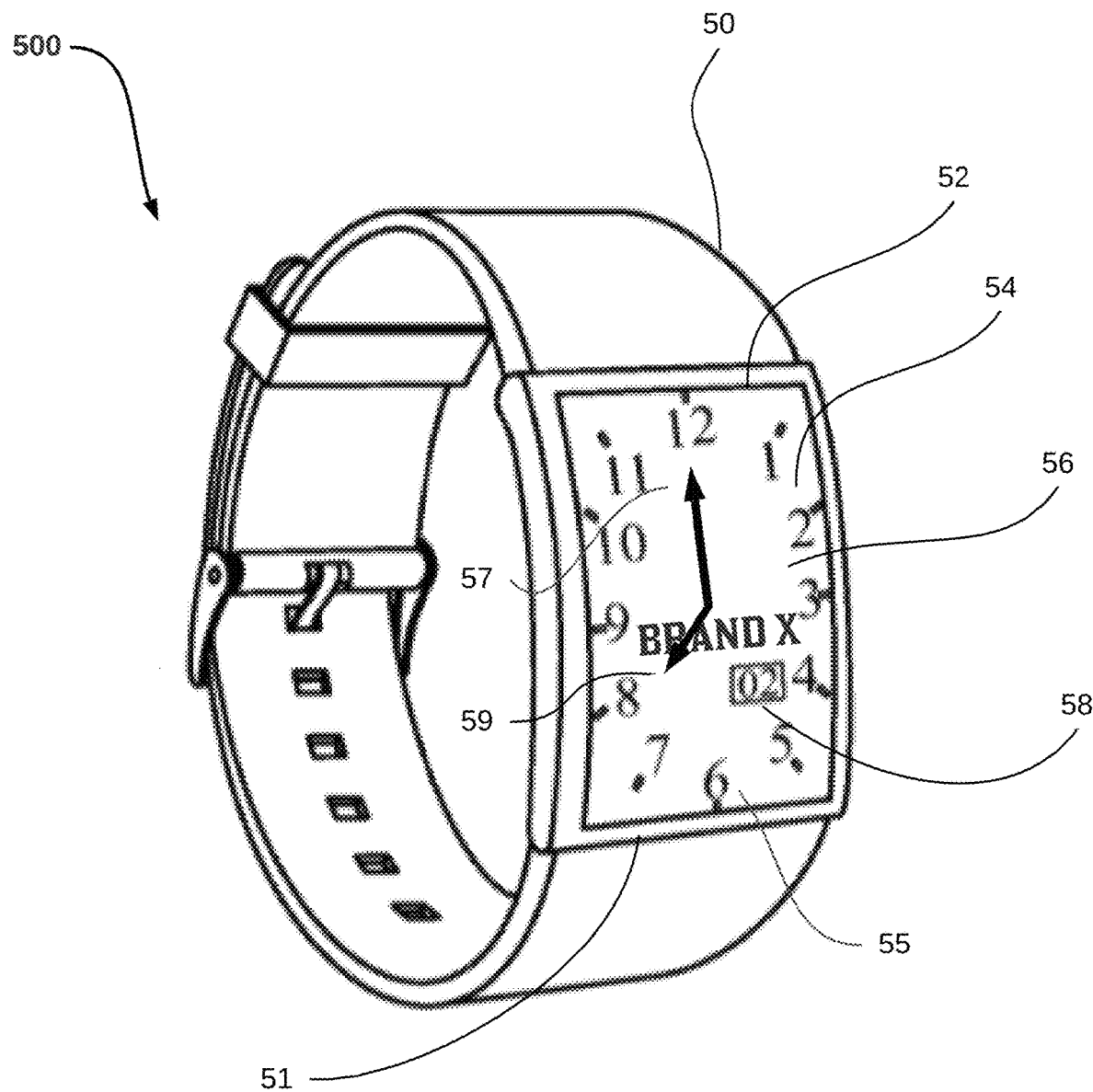
FIG. 5. illustrated an exemplary watch screen displaying a watch face that may be utilized by a system to create a customized watch face and retrieve the watch face to be displayed, in accordance with one or more implementations.

FIG. 5 illustrates an exemplary watch 500 including a watch screen displaying a watch face 54 that may be utilized by a system to create a customized watch face and retrieve the watch face to be displayed, in accordance with one or more implementations. Watch 500 may include a watch band 50, a watch screen 52, and/or other components. Watch screen 52 may be the same as or similar to user watch screen(s) 127 (as shown in FIG. 1). Watch screen 52 may be held by a frame 51 and/or other casings and/or holdings. In some implementations, watch screen 52 may have a square shape, a rectangular shape (as shown in FIG. 5), a circular shape, an oval shape, and/or other shapes. Watch screen 52 may be configured to display a watch face 54 and/or other watch faces and/or content. Watch face 54 may include one or more watch face features. The watch face features may include one or more of hour markers 55, backsplash 56, minute hand 57, date display 58, hour hand 59, and/or other components of watch face 54. In some implementations, the values of the one or more watch face features may have been selected by the user through a selection interface that is the same as or similar to selection interface 400. In some implementations, watch face 54 may be adjusted prior to being displayed on watch screen 52. Watch face 54 may be adjusted in size, arrangement, orientations, and/or other aspects for watch face 54 to be optimally displayed on watch screen 52. In some implementations, watch face 54 may be adjusted by one or more computer program components included in system 100 (e.g., display component 118) and/or one or more compute program components included in watch 500. Adjustment of watch face 54 may be based on the size, shape, type, and/or other aspects of watch 500, watch face 54, and/or other information.

Referring to FIG. 1, user interface(s) 125 may be configured to facilitate interaction between users 123 and system 100 and/or between users 123 and client computing platform(s) 104. In some implementations, user interface(s) 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interface(s) 125 may be included in one or more client computing platform(s) 104. In some implementations, one or more user interfaces 125 may be included in system 100. In some implementations, user interface(s) 125 may be a type of interface that facilitates the exchange of virtual items between users.

Referring to FIG. 1, in some implementations, server(s) 102, client computing platform(s) 104, administration server(s) 115, decentralized ledger server(s) 111, and/or external resources 126 may be operatively linked via one or more electronic communication links. For example, such electronic communication links may be established, at least in part, via one or more network(s) 116 such as the Internet and/or other networks. It will be appreciated that this is not intended to be limiting, and that the scope of this disclosure includes implementations in which server(s) 102, client computing platform(s) 104, administration server(s) 115, decentralized ledger server(s) 111, and/or external resources 126 may be operatively linked via some other communication media.

A given client computing platform 104 may include one or more processors configured to execute computer program components. The computer program components may be configured to enable an expert or user associated with the given client computing platform(s) 104 to interface with system 100 and/or external resources 126, and/or provide other functionality attributed herein to client computing platform(s) 104. By way of non-limiting example, the given client computing platform(s) 104 may include one or more of a desktop computer, a laptop computer, a handheld computer, a tablet computing platform, a NetBook, a Smartphone, a gaming console, and/or other computing platforms.

Administration server(s) 115 may include one or more of server(s) 102a, processor(s) 130a, machine-readable instructions 106a, electronic storage 128a, and/or other components. Server(s) 102a may be configured by machine-readable instructions 106a. Machine-readable instructions 106a may include one or more instruction components. The instruction components may include one or more of input component 120, communication component 122, and/or other instruction components. Administration server(s) 115 may include communication lines, or ports to enable the exchange of information with a network and/or other computing platforms. In some implementations, administration server(s) 115 may be used by one or more administrative users, e.g., to configure and/or control operation of system 100. In some implementations, administrative server(s) 115 may include or user one or more user interfaces to receive user input and/or otherwise interact with one or more administrative users. In some implementations, the one or more administrative user may be able to modify the associated costs of the values of watch face features, the cost of pre-selected watch face designs, and/or make other modifications. In some implementations, the one or more administrative users may be able to make transactions of consideration and/or value from and/or to the administrative wallet.

External resources 126 may include sources of information outside of system 100, external entities participating with system 100, external providers of computation and/or storage services, and/or other resources. In some implementations, some or all of the functionality attributed herein to external resources 126 may be provided by resources included in system 100. In some implementations, external resources 126 may include one or more blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, and/or 122, and/or other components. Processor(s) 130 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 130 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 130 may be configured to execute one or more additional components that may perform some or all of the functionality attributed below to one of components 108, 110, 112, 114, 116, 118, 120, and/or 122.

Figure 2:
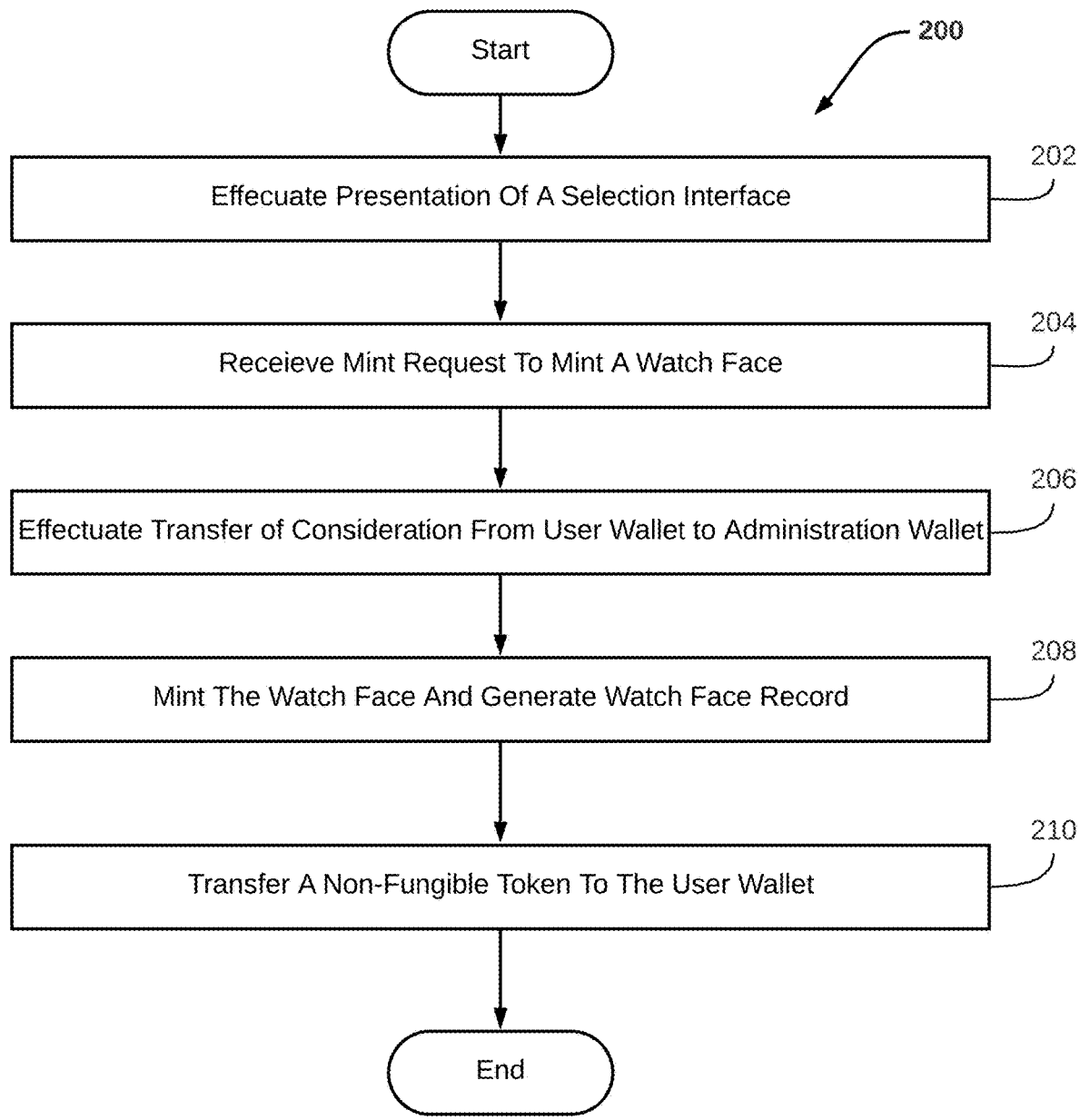
FIG. 2 illustrates a method to create a customized watch face, in accordance with one or more implementations.

FIG. 2 illustrates a method 200 to create a customized watch face, in accordance with one or more implementations. The customized watch face may be recorded on a decentralized ledger. The customized watch face may be capable of being displayed on a watch screen. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include effectuating presentation of a selection interface on a client computing platform associated with a user. The selection interface may facilitate entry and/or selection of a watch face design by the user. The watch face design may be defined by values of watch face features. Operation 202 may be performed by a presentation component that is same as or similar to presentation component 108 (shown in FIG. 1 and described herein).

An operation 204 may include receiving, from the client computing platform, a mint request to mint the watch face in accordance with the watch face design entered and/or selected through the selection interface. Operation 204 may be performed by a transaction component that is same as or similar to transaction component 110 (shown in FIG. 1 and described herein).

An operation 206 may include effectuating, responsive to receipt of the mint request, a transfer of consideration from a user wallet associated with the user to an administrative wallet. The user wallet and the administrative wallet may each correspond to addresses on the decentralized ledger such that the transfer of consideration involves a transfer of value on the decentralized ledger from the address associated with the user wallet to the address associated with the administrative wallet. Operation 206 may be performed by a transaction component that is same as or similar to transaction component 110 (shown in FIG. 1 and described herein).

An operation 208 may include, responsive to the administrative wallet receiving the consideration, minting the watch face. Minting the watch face may include generating a watch face record for the watch face in accordance with the watch face design. The watch face record may include the values of the watch face features that define the watch face design. The watch face record may include a watch face identifier. Operation 208 may be performed by a minting component that is same as or similar to minting component 112 (shown in FIG. 1 and described herein).

An operating 210 may include transferring a non-fungible token indicating the watch face identifier to the address on the decentralized ledger that corresponds to the user wallet. Operation 210 may be performed by a minting component that is same as or similar to minting component 112 (shown in FIG. 1 and described herein).

Figure 3:
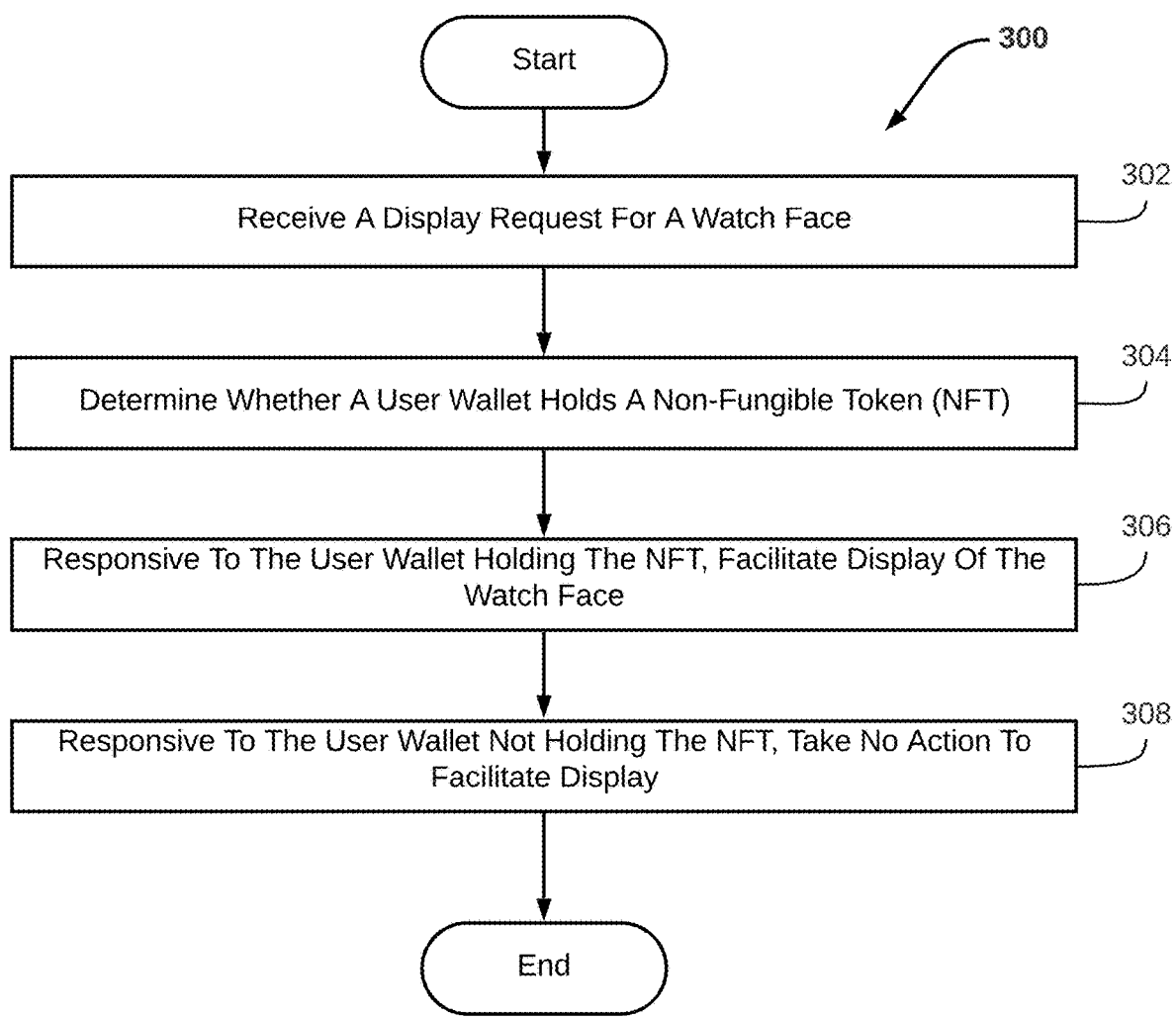
FIG. 3 illustrates a method to retrieve a watch face to be displayed, in accordance with one or more implementations.

FIG. 3 illustrates a method 300 to retrieve a watch face to be displayed on a watch screen, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving a display request to display the watch face on a watch screen. The display request may indicate the specific watch face, a user associated with the watch screen, and/or other information. Operation 302 may be performed by a receipt component that is same as or similar to receipt component 114 (shown in FIG. 1 and described herein).

An operation 304 may include, responsive to receiving the display request, determining whether a user wallet for a decentralized ledger holds a non-fungible token associated with the specific watch face. The user wallet being associated with the user. Operation 304 may be performed by a verification component that is same as or similar to verification component 116 (shown in FIG. 1 and described herein).

An operation 306 may include, responsive to the user wallet holding the non-fungible token associated with the watch face, facilitating display of the watch face on the watch screen. Facilitating display of the watch face may include initiating transmission of information to the watch screen that causes the watch screen to display the watch face. Operation 306 may be performed by a display component that is same as or similar to display component 118 (shown in FIG. 1 and described herein).

An operation 308 may include, responsive to the user wallet not holding the non-fungible token associated with the watch face, taking no further action to facilitate display of the watch face on the watch screen such that the watch face is not displayed on the watch screen. Operation 308 may be performed by a display component that is same as or similar to display component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to create a customized watch face, wherein ownership of the customized watch face is recorded on a decentralized ledger, and wherein the watch face is capable of being displayed on a watch screen, the system comprising:
one or more processors configured by machine-reachable instructions to:
effectuate presentation of a selection interface on a client computing platform associated with a user, wherein the selection interface facilitates entry and/or selection of a watch face design by the user, and wherein the watch face design is defined by values of watch face features selected by the user;
receive, from the client computing platform, a mint request to mint the watch face and thereby generate a new watch face in accordance with the watch face design entered and/or selected through the selection interface by the user;
responsive to receipt of the mint request, effectuate a transfer of consideration from a user wallet associated with the user to an administrative wallet, wherein the user wallet and the administrative wallet each correspond to addresses on the decentralized ledger such that the transfer of consideration involves a transfer of value on the decentralized ledger from the address associated with the user wallet to the address associated with the administrative wallet; and
responsive to the administrative wallet receiving the consideration and further responsive to receipt of the mint request:
(i) mint the watch face, wherein minting the watch face includes initiating operations that results in instantiation of the watch face, wherein the operations include generating a watch face record for the watch face in accordance with the watch face design, wherein the watch face record includes the values of the watch face features that define the watch face design, and wherein the watch face record includes a watch face identifier, and
(ii) transfer a non-fungible token indicating the watch face identifier to the address on the decentralized ledger that corresponds to the user wallet.

2. The system of claim 1, wherein generating a watch face record for the watch face further includes burning the watch face design, such that a second watch face cannot be minted by the system in accordance with the same watch face design.

3. The system of claim 1, wherein watch face features include one or more of hour hands, minute hands, backsplash, dials, subdials, hour markers, weather displays, or date displays.

4. The system of claim 1, wherein the selection interface displays associated costs for individual ones of the values of watch face features, and wherein the cost of the watch face design is based on the combined associated costs of the values of watch face features that define the watch face design.

5. The system of claim 1, wherein the values of watch face features defining the watch face design is randomly generated by the system, such that the watch face is minted and the watch face record is generated in accordance with the randomly generated watch face design.

6. A method configured to create a customized watch face, wherein ownership of the customized watch face is recorded on a decentralized ledger, and wherein the watch face is capable of being displayed on a watch screen; the method comprising:
effectuating presentation of a selection interface on a client computing platform associated with a user, wherein the selection interface facilitates entry and/or selection of a watch face design by the user, and wherein the watch face design is defined by values of watch face features selected by the user;
receiving, from the client computing platform, a mint request to mint the watch face and thereby generate a new watch in accordance with the watch face design entered and/or selected through the selection interface by the user;
responsive to receipt of the mint request, effectuating a transfer of consideration from a user wallet associated with the user to an administrative wallet, wherein the user wallet and the administrative wallet each correspond to addresses on the decentralized ledger such that the transfer of consideration involves a transfer of value on the decentralized ledger from the address associated with the user wallet to the address associated with the administrative wallet; and
responsive to the administrative wallet receiving the consideration and further responsive to receipt of the mint request:
(i) minting the watch face, wherein minting the watch face includes initiating operations that results in instantiation of the watch face, wherein the operations include generating a watch face record for the watch face in accordance with the watch face design, wherein the watch face record includes the values of the watch face features that define the watch face design, and wherein the watch face record includes a watch face identifier, and
(ii) transferring a non-fungible token indicating the watch face identifier to the address on the decentralized ledger that corresponds to the user wallet.

7. The method of claim 6, wherein generating a watch face record for the watch face further includes burning the watch face design, such that a second watch face cannot be minted in accordance with the same watch face design.

8. The method of claim 6, wherein watch face features include one or more of hour hands, minute hands, backsplash, dials, subdials, hour markers, weather displays, or date displays.

9. The method of claim 6, wherein the selection interface displays associated costs for individual ones of the values of watch face features, and wherein the cost of the watch face design is based on the combined associated costs of the values of watch face features that define the watch face design.

10. The method of claim 6, wherein the values of watch face features defining the watch face design is randomly generated by the system, such that the watch face is minted and the watch face record is generated in accordance with the randomly generated watch face design.

* * * * *